Nov. 24, 1931.   W. P. WEBBER ET AL   1,833,765
CIRCUIT CONTROLLER
Filed March 23, 1929
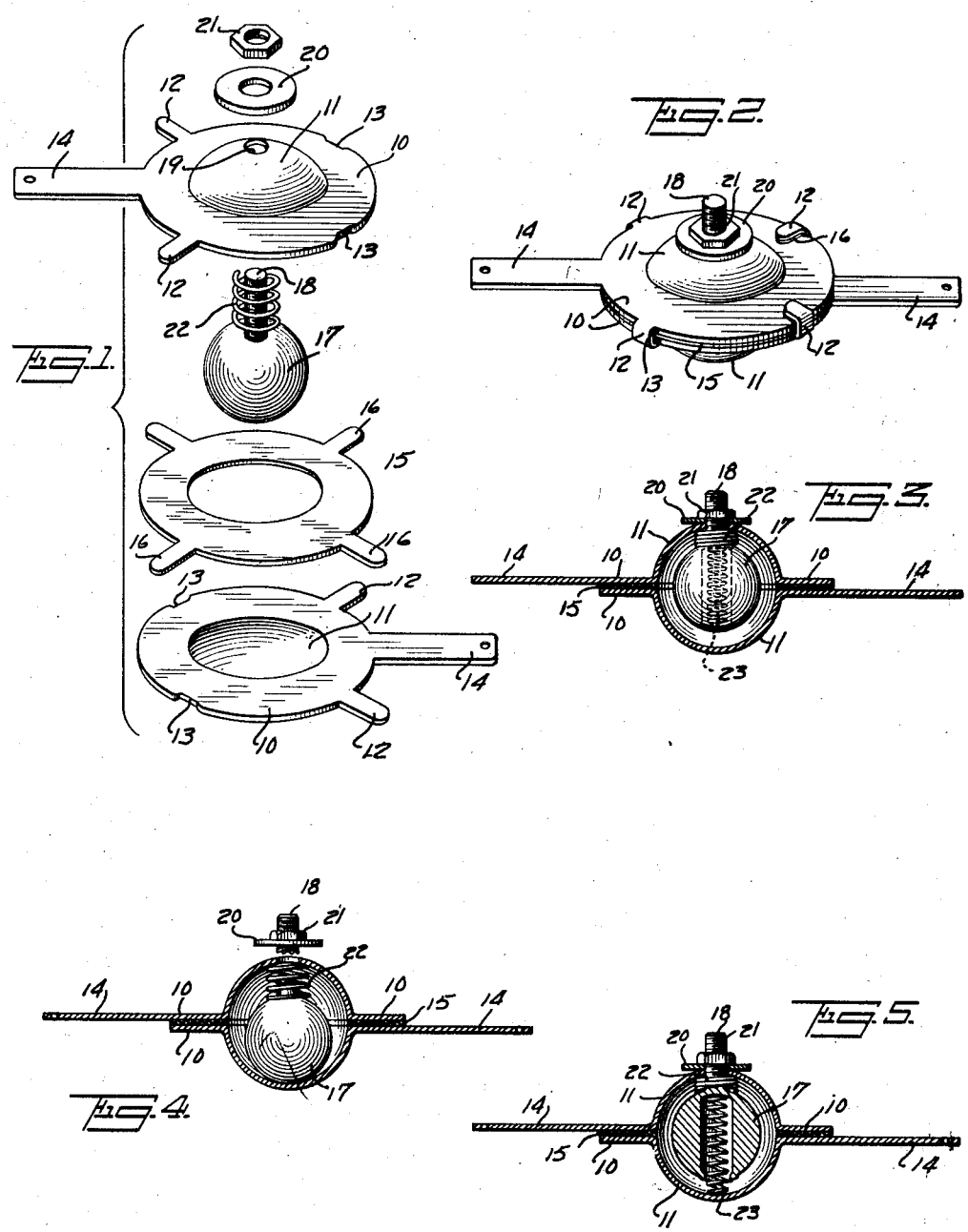
WITNESSES
INVENTOR
William P. Webber
Robert J. Wippermann
By
ATTORNEYS Patented Nov. 24, 1931

1,833,765

UNITED STATES PATENT OFFICE

WILLIAM PINCKNEY WEBBER AND ROBERT JULIUS WIPPERMANN, OF BROOKLYN, NEW YORK

CIRCUIT CONTROLLER

Application filed March 23, 1929. Serial No. 349,425.

This invention relates to circuit controllers.

It is among the objects of the present invention to provide a circuit controller operable in response to temperature changes.

A further object of the invention is to provide a circuit controller which normally retains the circuit open and which upon predetermined change in temperature completes the circuit.

A further object of the present invention is to provide a circuit controller including a plurality of means operable in response to thermal conditions for completing the circuit.

The present invention is particularly adapted for use in an alarm circuit where it is desired to energize the circuit in response to temperature changes.

The invention contemplates the use of a low fusion point metal which upon fusion will bridge the circuit. The invention also contemplates the encasing of an expansion spring under tension within fusible metal whereby fusion will release the spring, allowing it to complete an electrical circuit.

Numerous other objects and features will be apparent from a consideration of the following specification taken in conjunction with the accompanying drawings, in which Figure 1 is a collective view of the various parts of the structure disassembled;

Fig. 2 is a plan view of one preferred embodiment of the invention;

Fig. 3 is a sectional view of that form of the invention shown in Fig. 2;

Fig. 4 is a similar view illustrating one mode of operation of the device, and

Fig. 5 is a similar view illustrating the release of the expansion spring.

The form of the invention herein illustrated includes a casing formed by a pair of similar co-operating members 10 which include central concave portions 11, projecting ears 12, recesses 13, and connecting arms 14. It is understood that the invention is not confined to the specific structure of the members 10 as herein outlined and that numerous changes in the structure of the members may be resorted to without departing from the spirit of the invention. It will be understood that the casing 10 is formed of suitable material whereby the device readily resists corrosion and retains the inner assembly dust-proof and at all times in operative position.

In assembling the members 10, an insulating washer 15 is provided which is centrally apertured and which is provided with extending insulating fingers 16. The washer 15 is adapted to be positioned between the parallel side surfaces of the members 10 with the fingers registering with the ears 12. The ears 12 are bent over to receive within the recesses 13 of the opposite member. Thus by referring to Fig. 2, it will be seen that a divided casing is provided, the two co-operating members 10 being insulated from each other. It will be understood that the washer 15 may be of any suitable insulating material and is preferably of heat-resisting material so that the function of the apparatus under heat will not be interfered with by impairment of the insulation.

Associated with one of the members 10 and mounted by such association within the casing and spaced from the opposite member, there is provided a fusible element 17, illustrated in spherical form and including an extending externally threaded supporting shaft 18, which extends through an aperture in the concave portion 11 of the member 10 with which it is associated, the aperture being illustrated at 19 in Fig. 1. For securing the element 17 in properly spaced position within the casing, the shaft 18 extends through the aperture 19 and is surrounded externally of the casing by a washer 20 and nut 21. By referring to Figs. 2 and 3, it will be seen that the nut may be tightened or adjusted to secure the proper spaced relation of the element 17 with respect to the surface 11 of the opposite member 10. Internally of the casing the shaft 18 is provided with an expansion or coiled spring 22 which applies the proper tension upon the element 17 urging it toward the opposite surface, movement of the spring being retained by adjustment of the nut 21.

The element 17 may be of any desired configuration and preferably has embodied therein in alinement with the shaft 18, a contracted expansion spring 23. The spring 23 is shown as a coiled spring encased within the element 17 in close coiled position, whereby disruption of the element 17 will release the spring, and whereby it may be expanded to bridge the insulating members 10 and permit passage of current therethrough. The element 17 is preferably of volume greater than one-half the volume of its chamber, whereby expansion of the metal on melting will fill the chamber, thus insuring proper electrical connection between the insulated side members thereof.

In the operation of the device, the members are assembled as indicated in Figs. 1, 2 and 3, the oppositely expanding arms 14 being associated with opposite potentials of an electrical circuit. It will be understood that the device may be used in any type of circuit, it being preferably designed for alarm circuits in which a completion of the circuit will effect an alarm apparatus. With the device arranged in the circuit as disclosed, the opposite members 10 will be oppositely polarized but will be insulated one from another by the provision of the washer 15.

When the device is exposed to heat, the shaft 18 due to its formation from easily fusible metal, will sever, thus permitting the spring 22 to expand, forcing the element 17 outwardly and in contact with the opposite member 10, thus completing the circuit between the members and permitting electrical energy to pass through the device. In this operation of the device, it has been found that the washer 20 serves not only as a facing against which the nut 21 abuts, but also as a severing means for the shaft 18. When the shaft 18 begins to fuse due to heat, the washer 20 acts as a cutting member to sever the shaft.

In conjunction with the severing of the shaft 18 or independently thereof, the element 17 may fuse, thus permitting an expansion of the internal spring 23, whereby the spring will extend from the confines of the member 17 and will bridge the side members 10 to complete the electrical circuit, as illustrated in Fig. 5. It will be understood that in most instances the severing of the shaft and the releasing of the spring 23 will occur simultaneously. It will be seen, however, that should anything interfere with one of the means for completing the circuit, an alternative means is provided, thus insuring successful operation of the device.

From the foregoing it will be seen that the present invention provides a novel, simple, economical and doubly efficient structure, which may be easily installed in a circuit and which is especially designed to meet the demands of economic manufacture.

It will be understood that numerous changes and modifications and the full use of equivalents may be resorted to in the manufacture, use or sale of the device, without departing from the spirit of the invention. With this in mind, it will be seen that a circuit controller having insulated sections may be formed in various ways other than the structure herein disclosed without departing from the spirit or scope of the appended claims.

What is claimed is:

1. A circuit controller including a pair of mating insulated portions defining a chamber, a fusible element within the chamber carried by one of said portions, and a normally restrained means for urging said element upon fusion to a position to bridge said portions whereby to permit electrical energy to pass therebetween.

2. A circuit controller, including a chamber having electrically insulated portions, a fusible element associated with one of said portions adapted upon fusion to bridge said portions to permit electrical energy to pass therebetween, and means for urging said element from the attached portion toward the corresponding portion, said means including an expansion spring associated with said element, said spring being confined within said element and releaseable upon fusion thereof.

3. In a device of the character described, a casing formed by a pair of insulated conducting members, a circuit controlling element carried by one of said members and fusibly associated therewith whereby fusion thereof will disengage said member to electrically connect said members, and an expansion spring associated with said element to urge said member upon fusion towards the opposite conducting member.

4. In a device of the character described, a casing formed by a pair of insulated conducting members, a circuit controlling element carried by one of said members and fusibly associated therewith whereby fusion thereof will disengage said member to electrically connect said members, an expansion spring associated with said element to urge said member upon fusion towards the opposite conducting member, and an expansion spring within said element releasable upon fusion to bridge said conducting members.

5. A circuit controller, including a pair of convex conducting members having extending ears for interengagment, means for insulating said members when in engaged position, a fusible element carried by one of said members positioned therebetween and spaced from the opposite member, and means for releasing said element, said means including a washer movable by gravity to release said fusible element upon fusion thereof.

6. A circuit controller, including a pair of convex conducting members having extending ears for interengagement, means for insulating said members when in engaged position, said means including an insulating washer positioned therebetween and having means co-operating with the ears of said conducting members, a fusible element carried by one of said members positioned therebetween and spaced from the opposite member, and means for releasing said element upon fusion.

7. A circuit controller, including a pair of convex conducting members having extending ears for interengagement, means for insulating said members when in engaged position, said means including an insulating washer positioned therebetween and having means co-operating with the ears of said conducting members, a fusible element carried by one of said members positioned therebetween and spaced from the opposite member, and means for releasing said element upon fusion, said means including an extending shaft for supporting said element receivable through its supporting member.

8. A circuit controller, including a pair of convex conducting members having extending ears for interengagement, means for insulating said members when in engaged position, said means including an insulating washer positioned therebetween and having means co-operating with the ears of said conducting members, a fusible element carried by one of said members positioned therebetween and spaced from the opposite member, means for releasing said element upon fusion, said means including an extending shaft for supporting said element receivable through its supporting member, and an expansion spring normally urging said element toward the opposite member.

9. A circuit controller, including a pair of convex conducting members having extending ears for interengagement, means for insulating said members when in engaged position, said means including an insulating washer positioned therebetween and having means co-operating with the ears of said conducting members, a fusible element carried by one of said members positioned therebetween and spaced from the opposite member, means for releasing said element upon fusion, said means including an extending shaft for supporting said element receivable through its supporting member, an expansion spring normally urging said element toward the opposite member, and an expansion spring within said element releasable upon fusion thereof.

10. A thermally operating circuit closer comprising a pair of spaced, electrically separated plates having spherically shaped surfaces adjacent each other, and a conducting ball attached to the sperical surface of one of said plates by a fusible medium but spaced from the adjacent surface of the other plate, whereby the fusing of the fusible medium will cause the ball to move to bridge the space between the two plates to make an electrical circuit.

11. A thermally operating circuit closer comprising a pair of spaced integral sheet metal plates, spherical surfaces formed on adjacent ends of said plates, a conducting sphere associated with the sperical surface of one of said plates and connected thereto by a fusible medium, said conducting sphere being slightly spaced out of contact with the spherical surface of the other plate, and insulating means interposed between the plates to definitely space the same, and binding means extending between the plates and co-operating with the insulating means to hold the plates firmly in their proper relation.

WILLIAM PINCKNEY WEBBER.
ROBERT JULIUS WIPPERMANN.